United States Patent Office 3,200,082
Patented Aug. 10, 1965

3,200,082
METAL LOADING OF MOLECULAR SIEVES
Donald W. Breck, Tonawanda, and Stanley W. Bukata, Buffalo, N.Y., assignors to Union Carbide Corporation, a corporation of New York
No Drawing. Filed Sept. 24, 1958, Ser. No. 762,952
8 Claims. (Cl. 252—455)

This invention relates to a process for preparing metal-loaded zeolitic molecular sieves which are suitable for use as catalysts, scavengers, and getters.

The use of metals as catalysts, scavengers, and getters in a number of chemical reactions and chemical systems is well known in the art. The effectiveness of the metal in such cases has been found to depend, to a considerable degree, on the form in which the metal is present in the reaction zone.

It is an object of this invention to provide a process for introducing metals into the internal adsorption area of zeolitic molecular sieves to provide superior catalysts, scavengers, and getters.

Other objects will be apparent from the subsequent disclosure and appended claims.

The process which satisfies the objects of the present invention comprises intimately contacting a zeolitic molecular sieve with an aqueous solution of a metal-amine complex cation of the metal to be contained in the zeolitic molecular sieve, whereby ion-exchange occurs between the complex cations and the exchangeable cations of the zeolitic molecular sieve; drying said ion-exchanged zeolitic molecular sieve; activating said dried, ion-exchanged, zeolitic molecular sieve in an inert atmosphere; and reducing the complex cations in said activated zeolitic molecular sieves to the elemental metal whereby said elemental metal is retained in the inner adsorption region of said zeolitic molecular sieve.

Zeolitic molecular sieves, both natural and synthetic, are metal aluminosilicates. The crystalline structure of these materials is such that a relatively large adsorption area is present inside each crystal. Access to this area may be had by way of openings or pores in the crystal. Molecules are selectively adsorbed by molecular sieves on the basis of their size and polarity among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example, metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied by elemental metal is available for adsorption of molecules having a size, shape, and energy which permits entry of the adsorbate molecules into the pores of the molecular sieves.

The zeolitic molecular sieves, to be useful in the present invention, must be capable of adsorbing benzene molecules under normal conditions of temperature and pressure. Included among these molecular sieves, and preferred for the purposes of the present invention, are the natural zeolite faujesite, and synthetic zeolites X, Y, and L. The natural materials are adequately described in the chemical art. The characteristics of the aforementioned synthetic materials, and the processes for making them, are provided below.

The general formula for zeolite X, expressed in terms of mol ratios of oxides, is as follows:

$$0.9 \pm 0.2\, M_{\frac{2}{n}}O : Al_2O_3 : 2.5 \pm 0.5\, SiO_2 : 0 \text{ to } 8\, H_2O$$

In the formula "M" represents a cation, for example hydrogen or a metal, and "$n$" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented in the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $$0.9\, Na_2O : Al_2O_3 : 2.5\, SiO_2 : 6.1\, H_2O$$

The major lines in the X-ray diffraction pattern of zeolite X are set forth in Table A below:

TABLE A

| d value of reflection in A. | 100 I/I₀ |
| --- | --- |
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the K-alpha doublet of copper, and a Geiger counter spectrometer with a strip chart pen recorder was used. The peak heights, I, and the positions as a function of 2θ, where θ is the Bragg angle, were read from the spectrometer chart. From these, the relative intensities, 100 I/I₀, where I₀ is the intensity of the strongest line or peak, and d(obs) the interplanar spacing in A., corresponding to the recorded lines were calculated. The X-ray patterns indicate a cubic unit cell of dimensions between 24.5 A. and 25.5 A.

To make sodium zeolite X, reactants are mixed in aqueous solution and held at about 100° C. until the crystals of zeolite are formed. Preferably the reactants should be such that in the solution the following ratios prevail:

$SiO_2/Al_2O_3$ ------------------------------------- 3–5
$Na_2O/SiO_2$ -------------------------------- 1.2–1.5
$H_2O/Na_2O$ -------------------------------- 35–60

The chemical formula for zeolite Y expressed in terms of oxide mole ratios may be written as $$0.9 \pm 0.2 Na_2O : Al_2O_3 : WSiO_2 : XH_2O$$

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in Table B. The values for the interplanar spacing, d, are expressed in angstrom units. The relative intensity of the lines of the X-ray powder diffraction data are expressed as VS, very strong; S, strong; M, medium; W, weak; and VW, very weak.

TABLE B

| hkl | h²+k²+l² | d in A. | Intensity |
|---|---|---|---|
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–5.08 | M |
| 440 | 32 | 4.37–4.79 | M |
| 620 | 40 | 3.90–4.46 | W |
| 533 | 43 | 3.77–3.93 | S |
| 444 | 48 | 3.57–3.79 | VW |
| 551, 711 | 51 | 3.46–3.48 | VW |
| 642 | 56 | 3.30–3.33 | S |
| 553, 731 | 59 | 3.22–3.24 | W |
| 733 | 67 | 3.02–3.04 | M |
| 660, 822 | 72 | 2.91–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10,10,0; 14, 2, 0 | 200 | 1.75–1.78 | W |
| 997; 11, 9, 3 | 211 | 1.70–1.71 | W |

When an aqueous colloidal silica is employed as the major source of silica, zeolite Y may be prepared by preparing an aqueous sodium aluminosilicate mixture having a composition, expressed in terms of oxide-mole-ratios, which falls within one of the following ranges:

| | Range 1 | Range 2 | Range 3 |
|---|---|---|---|
| Na₂O/SiO₂ | 0.20 to 0.40 | 0.41 to 0.61 | 0.61 to 0.80. |
| SiO₂/Al₂O₃ | 10 to 40 | 10 to 30 | 7 to 20. |
| H₂O/Na₂O | 25 to 60 | 20 to 60 | 20 to 60. | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole-ratios, falling within one of the following ranges:

| | Range 1 | Range 2 | Range 3 |
|---|---|---|---|
| Na₂O/SiO₂ | 0.6 to 1.0 | 1.5 to 1.7 | 1.9 to 2.1. |
| SiO₂/Al₂O₃ | 8 to 30 | 10 to 30 | About 10. |
| H₂O/Na₂O | 12 to 90 | 20 to 90 | 40 to 90. | maintaining the mixture at a temperature of about 100° C. until crystals are formed, and separating the crystals from the mother liquor.

The composition of zeolite L, expressed in terms of mole ratios of oxides, may be represented as follows:

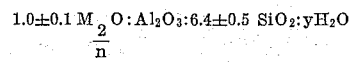

wherein "M" designates a metal, "n" represents the valence of "M"; and "y" may be any value from 0 to about 7.

The more significant d(A.) values, i.e., interplanar spacings, for the major lines in the X-ray diffraction pattern of zeolite L, are given below in Table C.

TABLE C 16.1±0.3
7.52±0.04
6.00±0.02
4.57±0.03
4.35±0.04
3.91±0.02
3.47±0.02
3.28±0.02
3.17±0.01
3.07±0.01
2.91±0.01
2.65±0.01
2.46±0.01
2.42±0.01
2.19±0.01

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally soluble. The exchangeable cations present in the zeolite may then conveniently be replaced by other exchangeable cations.

The potassium or potassium-sodium forms of zeolite L may be prepared by preparing an aqueous metal alumino-silicate mixture having a composition, expressed in terms of mole ratios of oxides falling within the following range:

$K_2O/(K_2O+Na_2O)$ _____ From about 0.33 to about 1.
$(K_2O+Na_2O)/SiO_2$ _____ From about 0.4 to about 0.5.
$SiO_2/Al_2O_3$ _____ From about 15 to about 28.
$H_2O/(K_2O+Na_2O)$ _____ From about 15 to about 41.

maintaining the mixture at a temperature of about 100° C. until crystallization occurs, and separating the crystals from the mother liquor.

To prepare the elemental metal-containing zeolitic molecular sieves of the present invention it is necessary to activate the complex cation-exchanged zeolitic molecular sieve prior to reduction of the complex cation. This may be accomplished by heating the zeolitic molecular sieve up to a temperature of about 350° C. in a flowing stream of inert dry gas or in vacuum. In the preferred form of the invention, the activation is effected at a temperature below the temperature at which the complex cation is destroyed. Under these conditions, particularly when substantially all of the water is removed from the zeolitic molecular sieve, a very high dispersion of the metal throughout the adsorption region is obtained. The metal so dispersed has a high specific surface with a corresponding high chemical and catalytic activity.

The pore size of the zeolitic molecular sieves which are useful in the present invention must be sufficiently large to permit adsorption of benzene. Molecular sieves having smaller pores will not permit entry of the metal-amine complex cations into the inner adsorption area of the crystal.

To prepare the elemental metal-containing, zeolitic molecular sieves by the process of the present invention, the zeolitic molecular sieves are treated with an aqueous solution containing complex cations of the metal to be deposited in the crystal structure. Examples of metal complexes which are suitable for the present process are water-soluble metal amine cations, both organic and inorganic. The cations ion-exchange with the cations normally present in the zeolites. The exchanged zeolite is then removed from the solution, dried and activated. The activated molecular sieve may then be subjected to heat treatment to a temperature not exceeding about 650° C. and preferably not exceeding about 500° C. in vacuum, inert atmosphere, or even in air, whereby the complex cation is destroyed and the metal is reduced in the molecular sieve. Should the thermal treatment be insufficient to reduce the complex cation to the metallic state, chemical reduction, either alone or in combination with thermal reduction, may be employed. Alkali metals, such as sodium, are suitable reducing agents for this purpose. However, as with the thermal reduction it is necessary to maintain operating conditions which are not destructive of the crystal structure of the molecular sieve. For example, temperatures exceeding the recommended upper limits tend to destroy the crystal structure and should be avoided. Similarly, extremely acid solutions are detrimental to the crystal structure of the zeolitic molecular sieves.

Some of the metals which may be incorporated in the zeolitic molecular sieves include copper, silver, gold, chromium, zinc, cadmium, lead, tin, iron, cobalt, nickel, ruthenium, rhodium, palladium, osmium, iridium, and platinum.

The reducing agents which are suitable for the chemical reduction of the complex cation include those elements which are more electropositive than the metal component of the cation to be reduced.

*Example I*

Tetramine platinous chloride hydrate, $Pt(NH_3)_4Cl_2 \cdot H_2O$, was prepared according to the method found in the reference, Fernelius, W. C., Inorganic Syntheses, vol. II, 250 (1946). To 2.5 grams of tetramine platinous chloride hydrate in 500 milliliters of water was added 62 grams of hydrated sodium zeolite X powder with stirring. After stirring for one hour the resultant suspension was filtered and washed first with distilled water, then alcohol, and finally ether. It was dried in air. Some of the sodium cations had been replaced by a complex cation containing platinum. Upon heating the complex ion-exchanged zeolite at 375° C. in hydrogen for two hours, ammonia was evolved and the platinum was reduced to the metallic state within the molecular sieve. Hydrogen cations replaced the complex cations which had been present in the molecular sieve structure and the remainder of the cations were the original sodium cations.

*Example II*

Tris(ethylenediamine) chromium (III) sulfate was prepared according to the method found in the reference, Fernelius, W. C., Inorganic Syntheses, vol. II, 198 (1946). Five grams of hydrated sodium zeolite X powder was stirred with 50 milliliters of 0.5 M aqueous solution of tris(ethylenediamine) chromium (III) sulfate for one hour. The suspension was filtered and washed first with distilled water, then alcohol, and finally ether. It was dried in air. Some of the sodium cations had been replaced by a complex cation containing chromium. Five grams of this ion-exchanged product were heated to 350° C. for two hours to decompose the complex ion and remove the amine. The temperature was then reduced to 170° C. and 5 grams of molten metallic sodium were slowly added under a stream of argon. The chromium was reduced by the sodium whereupon the chromium cation was replaced by sodium cations in the structure of the molecular sieve and the chromium was deposited within the molecular sieve. The product was black and contained 9 weight-percent chromium by chemical analysis. Upon exposure to air the product turned brown indicating the oxidation of the chromium.

*Example V*

A suspension of 2.5 grams of sodium zeolite X in 10 milliliters of water and 100 milliliters of an aqueous solution containing one gram of bis(ethylenediamine) auric chloride $[Au(NH_2CH_2CH_2NH_2)_2]Cl_3$, were mixed and the mixture was stirred for 40 minutes. The zeolite was filtered from the solution, washed thoroughly with distilled water and then with alcohol and ether. A gold loaded zeolite X was obtained by heating a portion of the above product at 375° C. without the necessity of a hydrogen atmosphere and another portion was treated at 375° C. with a hydrogen atmosphere. In both cases a gold-loaded zeolite containing approximately 15 weight-percent of gold was obtained.

*Example VI*

Approximately 1.4 grams of palladium chloride were dissolved in 100 milliliters of concentrated ammonia. The solution was heated to boiling to remove excess ammonia and cooled. Ten grams of sodium zeolite X were suspended in the solution and the suspension was stirred for 20 minutes. The zeolite crystals were filtered and then washed with water then alcohol and ether. The crystals were heated to 375° C. in air yielding a palladium-loaded molecular sieve containing 5.7 weight-percent of palladium metal.

*Example VII*

An aqueous solution of complex ruthenium-amine complex cations was prepared by dissolving a gram of ruthenium chloride in 25 milliliters of water and adding thereto 150 milliliters of aqueous ammonia. The solution was boiled for two hours after which it was red-violet. Additional heating caused the color to change to brown. To this solution was added 7 grams of sodium zeolite X slurried in 50 milliliters of water. It was stirred for 5 minutes and then filtered. The product was dried overnight at 100° C. Heating the molecular sieve at an elevated temperature produced a ruthenium metal-loaded zeolite containing 7.1 weight-percent ruthenium.

*Example VIII*

An aqueous suspension consisting of 20 grams of zeolite Y suspended in 200 milliliters of water was mixed with 100 milliliters of an aqueous solution containing one gram of tetramine platinous chloride hydrate, $$[Pt(NH_3)_4]Cl_2 \cdot H_2O$$

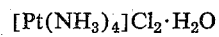

The mixture was stirred for 2 hours. The ion-exchanged zeolite produced was removed by filtering, washed with distilled water and dried, at 110° C. for one hour. The dried product was heated at 400° C. to drive off volatile constituents including the intracrystalline water; decomposition of the complex cations resulted to produce a platinum-loaded molecular sieve containing 2.9 weight-percent of platinum.

The maximum metal that may be incorporated in the zeolitic molecular sieves by the process of the present invention is limited by the extent to which the molecular sieves may be ion-exchanged with the desired cations. However, since the metal is distributed throughout the molecular sieves according to the location of the ion-exchange sites of the crystals, it is possible to obtain a high degree of dispersion of the metal throughout the crystals and the contained metal has a very high specific surface.

The products produced by the process of the present invention are quite useful as catalysts, and particularly as selective catalysts for the specific catalysis of reactants which are mixed with other materials which are not adsorbed by the zeolitic molecular sieve. The adsorbed reactants react leaving the non-adsorbed materials unreacted.

Similarly, the products are useful as selective getters, gettering certain components of a mixture without affecting the other components.

The metal-containing zeolite molecular sieves are useful as a means for effecting the controlled addition of metals to reaction systems.

Still another advantage of the use of metal-loaded zeolitic molecular sieves resides in the fact that the tendency for the metal to migrate is minimized. Normal catalysts consisting of supporting metals exhibit migration of the metal during catalysis thereby giving rise to unequal distribution of catalyst material with a corresponding decrease in catalytic effectiveness.

Additionally, these metal-loaded zeolitic molecular sieves may be employed for the production of molecular sieves loaded with other materials. For example, a chromium-containing zeolitic molecular sieve may be subjected to mild oxidizing treatment whereby the chromium metal is converted to chromium oxides. The chromium oxide-loaded molecular sieve may then be used as a superior selective chrome oxide catalyst.

As used herein the term "activation" is employed to designate the removal of water from the zeolitic molecular sieves, i.e., dehydration, and does not refer to catalytic activity. The zeolitic molecular sieves containing the elemental metal and/or metal oxides exhibit catalytic activity.

The products of the present invention have surface areas about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysis in the internal portion of the molecular sieve. Since this region is available only through pores of molecular size it may be seen that selective chemisorption and catalysis may be obtained in a system containing a mixture of molecules some of which are too large to enter the pores whereas others are capable of entering the pores.

Zeolite X is described and claimed in U.S. Patent No. 2,882,244 issued April 14, 1959, to R. M. Milton.

Zeolite Y is described and claimed in U.S. Patent No. 3,130,007 issued April 21, 1964.

Zeolite L is described and claimed in U.S. patent application Serial No. 711,565 filed January 28, 1958, and now abandoned.

Zeolites X, Y, and faujasite have been found to be most satisfactory for the purposes of the present invention.

What is claimed is:

1. A process for preparing an elemental metal-containing rigid three-dimensional crystalline metal aluminosilicate zeolite of the molecular sieve type which comprises intimately contacting a rigid three-dimensional crystalline metal aluminosilicate zeolite of the molecular sieve type capable of adsorbing benzene internally with an aqueous solution of a metal-amine complex cation wherein the metal is selected from the group consisting of copper, silver, gold, chromium, zinc, cadmium, lead, tin, iron, cobalt, nickel, ruthenium, rhodium, palladium, osmium, iridium and platinum whereby ion-exchange occurs between said complex cations and the exchangeable cations of said crystalline metal aluminosilicate zeolite; drying said ion-exchanged crystalline metal aluminosilicate zeolite; dehydrating said dried, ion-exchanged crystalline metal aluminosilicate zeolite in an inert atmosphere; and reducing the complex cations in said dehydrated crystalline metal aluminosilicate zeolite to the elemental whereby said elemental metal is retained in the inner adsorption region of said crystalline metal aluminosilicate zeolite.

2. A process for preparing an elemental metal-containing rigid three-dimensional crystalline metal aluminosilicate zeolite of the molecular sieve type which comprises intimately contacting a rigid three-dimensional crystalline metal aluminosilicate zeolite of the molecular sieve type chosen from the group consisting of zeolite X, zeolite Y, zeolite L, and faujasite with an aqueous solution of a metal-amine complex cation wherein the metal is selected from the group consisting of copper, silver, gold, chromium, zinc, cadium, lead, tin, iron, cobalt, nickel, ruthenium, rhodium, palladium, osmium, iridium and platinum whereby ion-exchange occurs between said complex cations and the exchangable cations of said crystalline metal aluminosilicate zeolite; drying said ion-exchanged crystalline metal aluminosilicate zeolite; dehydrating said dried, ion-exchanged crystalline metal aluminosilicate zeolite in an inert atmosphere; and reducing the complex cations in said dehydrated crystalline metal aluminosilicate zeolite to the elemental whereby said elemental metal is retained in the inner adsorption region of said crystalline metal aluminosilicate zeolite.

3. A process as disclosed in claim 2 wherein the crystalline metal aluminosilicate zeolite is zeolite X.

4. A process as disclosed in claim 2 wherein the crystalline metal aluminosilicate zeolite is zeolite Y.

5. A process for preparing a catalyst which comprises contacting a rigid three-dimensional crystalline metal aluminosilicate zeolite of the molecular sieve type, capable of absorbing benzene internally, with an aqueous solution of a metal-amine complex of a metal selected from the group consisting of platinum, palladium, ruthenium, osmium, iridium and rhodium whereby ion-exchange occurs between said amine complex and the exchangeable cations of said zeolite, drying said ion-exchanged zeolite and reducing the amine complex in said ion-exchanged zeolite to the elemental metal whereby said elemental metal is retained in the inner adsorption region of said zeolite.

6. A process for preparing a catalyst which comprises contacting zeolite X with a metal-amine complex of a metal selected from the group consisting of platinum, palladium, ruthenium, osmium, iridium and rhodium whereby ion-exchange occurs between said amine complex and the exchangeable cations of said zeolite, drying said ion-exchanged zeolite and reducing the amine-complex in said ion-exchanged zeolite to the elemental metal whereby said elemental metal is retained in the inner adsorption region of said zeolite.

7. A process for preparing a catalyst which comprises contacting zeolite Y with a metal-amine complex of a metal selected from the group consisting of platinum, palladium, ruthenium, osmium, iridium and rhodium whereby ion-exchange occurs between said amine complex and the exchangeable cations of said zeolite, drying said ion-exchanged zeolite and reducing the amine-complex in said ion-exchanged zeolite to the elemental metal whereby said elemental metal is retained in the inner adsorption region of said zeolite.

8. A process for preparing a catalyst which comprises contacting zeolite L with a metal-amine complex of a metal selected from the group consisting of platinum, palladium, ruthenium, osmium, iridium and rhodium whereby ion-exchange occurs between said amine complex and the exchangeable cations of said zeolite, drying said ion-exchanged zeolite and reducing the amine-complex in said ion-exchanged zeolite to the elemental metal whereby said elemental metal is retained in the inner adsorption region of said zeolite.

References Cited by the Examiner

UNITED STATES PATENTS

| | | | |
|---|---|---|---|
| 1,840,450 | 1/32 | Jaeger et al. | 252—454 |
| 1,920,795 | 8/33 | Jaeger | 252—455 |
| 2,306,610 | 12/42 | Barrer | 252—449 |
| 2,413,134 | 12/46 | Barrer | 252—449 |
| 2,617,712 | 11/52 | Bond | 252—455 |
| 2,882,243 | 4/59 | Milton | 252—455 |
| 2,882,244 | 4/59 | Milton | 252—455 |

MAURICE A. BRINDISI, *Primary Examiner.*

JULIUS GREENWALD, *Examiner.*